United States Patent
Huq et al.

(10) Patent No.: US 11,941,545 B2
(45) Date of Patent: Mar. 26, 2024

(54) SYSTEMS AND METHODS FOR GENERATING A BOUNDARY OF A FOOTPRINT OF UNCERTAINTY FOR AN INTERVAL TYPE-2 MEMBERSHIP FUNCTION BASED ON A TRANSFORMATION OF ANOTHER BOUNDARY

(71) Applicant: The MathWorks, Inc., Natick, MA (US)

(72) Inventors: Md Rajibul Huq, Shrewsbury, MA (US); Alec Stothert, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 972 days.

(21) Appl. No.: 16/717,108

(22) Filed: Dec. 17, 2019

(65) Prior Publication Data
US 2021/0182715 A1    Jun. 17, 2021

(51) Int. Cl.
*G06N 5/04*     (2023.01)
*G06N 5/048*    (2023.01)
*G06N 7/02*     (2006.01)

(52) U.S. Cl.
CPC .............. *G06N 5/048* (2013.01); *G06N 7/02* (2013.01); *G06N 7/023* (2013.01)

(58) Field of Classification Search
CPC .......... G06N 7/02; G06N 5/048; G06N 7/023
See application file for complete search history.

(56) References Cited

U.S. PATENT DOCUMENTS

| | | | |
|---|---|---|---|
| 8,515,884 B2 * | 8/2013 | Doctor | G05B 13/0275 706/15 |
| 2002/0099672 A1 * | 7/2002 | Ganesh | G06N 7/02 706/1 |

(Continued)

FOREIGN PATENT DOCUMENTS

| | | | | |
|---|---|---|---|---|
| CN | 113902145 A | * | 1/2022 | |
| EP | 2300965 B1 | * | 10/2019 | |

(Continued)

OTHER PUBLICATIONS

Oscar Castillo and Patricia Melin, A review on the design and optimization of interval type-2 fuzzy controllers, Applied Soft Computing (Elsevier), vol. 12, Issue 4, Apr. 2012, pp. 1267-1278.

(Continued)

*Primary Examiner* — Paulinho E Smith
(74) *Attorney, Agent, or Firm* — Cesari and McKenna, LLP

(57) ABSTRACT

Systems and methods may generate a boundary of a FOU for an interval type-2 MF based on a transformation of another boundary of the FOU. The systems and methods may receive a plurality of parameters for a type-1 MF that defines a boundary of the FOU for the interval type-2 MF and may receive at least one other parameter. The systems and methods may generate, based on a transformation of the type-1 MF utilizing the at least one parameter, a type-1 MF that defines a different boundary of the FOU. The system and methods may adjust the plurality of parameters and the at least one second parameter to adjust the FOU for use in a model representing, for example, a real-world physical system, where execution of the model executes a fuzzy inference system and generates results representing a behavior of the real-world physical system.

26 Claims, 10 Drawing Sheets

(56) References Cited

U.S. PATENT DOCUMENTS

| | | | | |
|---|---|---|---|---|
| 2011/0071969 | A1* | 3/2011 | Doctor | G05B 13/0275 706/15 |
| 2011/0131068 | A1* | 6/2011 | Lupien | G06Q 40/00 705/35 |
| 2013/0019125 | A1* | 1/2013 | Almubarak | G06N 5/048 714/E11.178 |
| 2016/0125645 | A1* | 5/2016 | Khormi | G06V 20/13 382/103 |
| 2018/0129873 | A1* | 5/2018 | Alghazzawi | G06V 40/20 |
| 2021/0182715 | A1* | 6/2021 | Huq | G06N 5/048 |
| 2022/0036221 | A1* | 2/2022 | Hargras | G06Q 40/00 |
| 2022/0147825 | A1* | 5/2022 | Owusu | G06N 7/023 |
| 2022/0156614 | A1* | 5/2022 | Dalli | G06N 5/045 |

FOREIGN PATENT DOCUMENTS

| | | | | |
|---|---|---|---|---|
| WO | WO-2009141631 | A2 * | 11/2009 | G05B 13/0275 |
| WO | WO-2020193329 | A1 * | 10/2020 | G06N 3/0436 |

OTHER PUBLICATIONS

C. Wagner and H. Hagras, A genetic algorithm based architecture for evolving type-2 fuzzy logic controllers for real world autonomous mobile robots, Proceedings of the IEEE Conference on Fuzzy Systems, London, 2007.

Chengdong Li, Jianqiang Yi, and Tiechao Wang, Stability Analysis of SIRMs Based Type-2 Fuzzy Logic Control Systems, WCCI 2010 IEEE World Congress on Computational Intelligence, Jul. 18-23, 2010—CCIB, Barcelona, Spain, pp. 2913-2919.

Castillo, R. Martinez-Marroquin, P, Melin, F. Valdez, and J. Soria, Comparative study of bio-inspired algorithms applied to the optimization of type-1 and type-2 fuzzy controllers for an autonomous mobile robot, Information Sciences, vol. 192, Jun. 1, 2012, pp. 19-38.

* cited by examiner

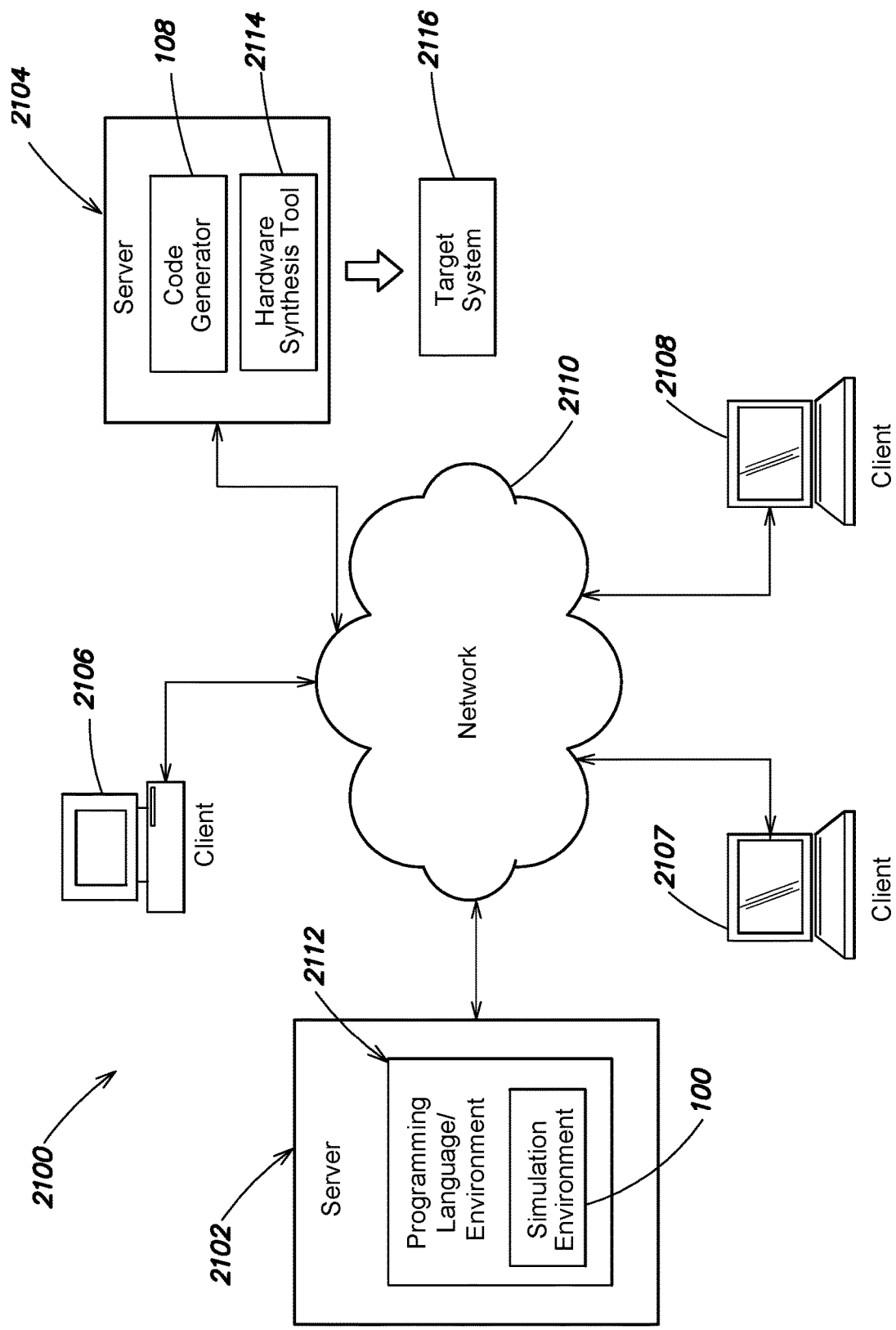

SYSTEMS AND METHODS FOR GENERATING A BOUNDARY OF A FOOTPRINT OF UNCERTAINTY FOR AN INTERVAL TYPE-2 MEMBERSHIP FUNCTION BASED ON A TRANSFORMATION OF ANOTHER BOUNDARY

BRIEF DESCRIPTION OF THE DRAWINGS

The description below refers to the accompanying drawings, of which:

FIG. 9 is a schematic diagram of a distributed computing environment in which systems and/or methods described herein may be implemented.

DETAILED DESCRIPTION OF AN ILLUSTRATIVE EMBODIMENT

Figure 1:
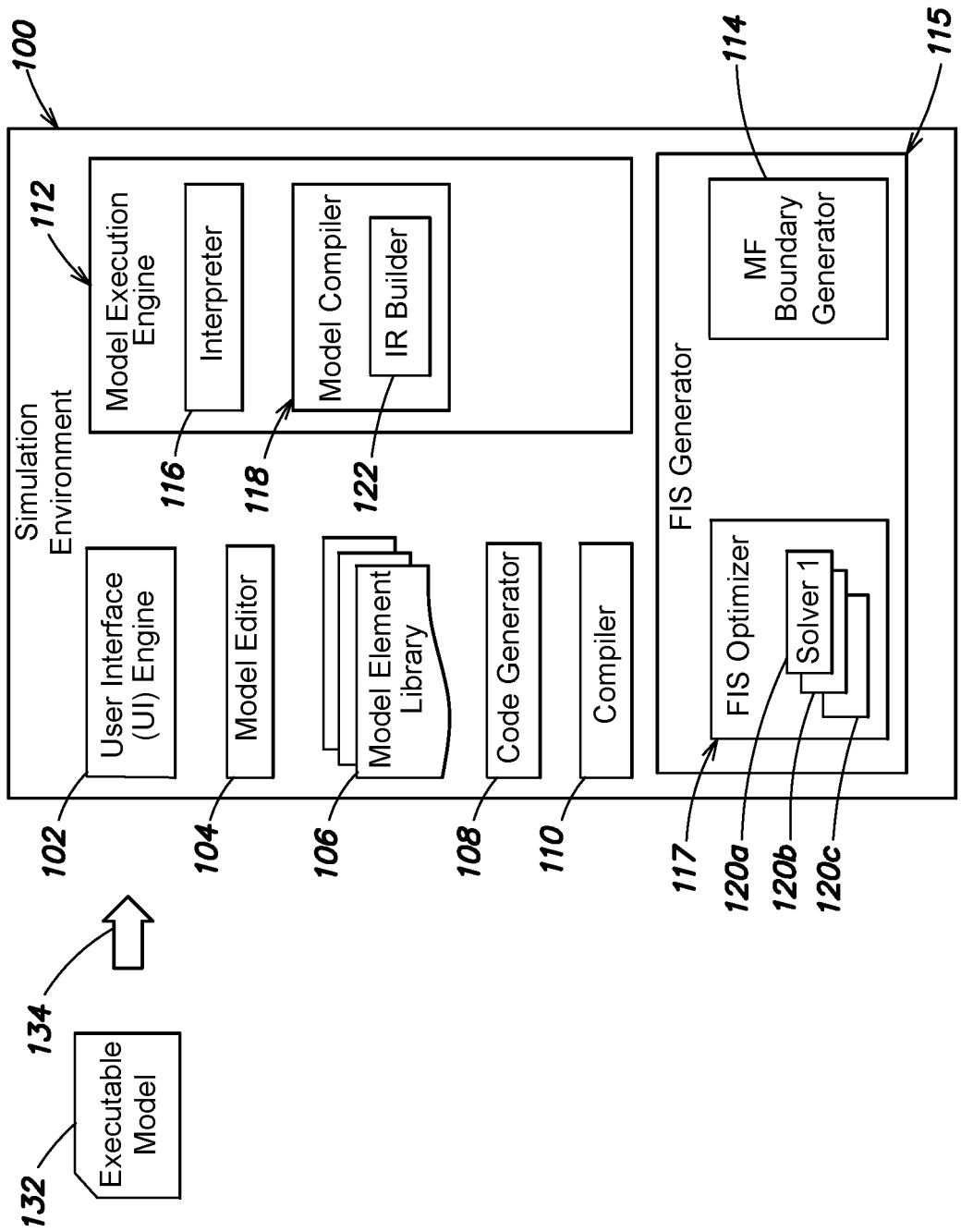
FIG. 1 is a schematic, partial illustration of an example simulation environment in accordance with one or more embodiments described herein.

A fuzzy inference system (FIS) can use rules, e.g., encoded in fuzzy membership functions (MFs), to generate outputs from inputs. A FIS can be used in various real-world systems, e.g., the controlling and steering of systems and complex industrial processes, Wireless Sensor Networks, systems for household and entertainment electronics, systems for other expert systems and applications like the classification of Synthetic-aperture radar (SAR) data, etc. For example, in autonomous driving systems, a FIS may receive as input distance information indicating the distance from a vehicle to an obstacle in the driving path of the vehicle, and generate as output an amount of breaking pressure that is to be applied for the vehicle. A traditional type-1 MF is a curve that defines how each input value is mapped to a single membership value (e.g., degree of membership or degree of truth) between 0 and 1 and quantifies the grade of membership.

For example, for the FIS for the autonomous driving system, let the input for the distance to the obstacle be defined utilizing a MF for "near." Thus, and with a traditional type-1 MF, each distance value would be mapped to single value between 0 and 1 to indicate the degree of membership for "near." For example, an input value of 2 feet to the obstacle may be mapped to a single membership value of 1 indicating that 2 feet qualifies perfectly as "near", while an input value of 6 feet may be mapped to a single membership value of 0.5 indicating the degree to which 6 feet qualifies as being "near." Therefore, a type-1 MF does not model uncertainty in the degree of membership, where, for example, "near" may mean different things to different experts. For example, 2 feet may be considered "perfectly near" by a first expert, while 2 feet may be considered "almost near" by a second expert. To model such uncertainty, interval type-2 MFs may be utilized, where the degree of membership can have a range of values. For example, 2.5 feet may be mapped to a plurality of different membership values (e.g., 0.7 and 0.8) to account for the uncertainty. As such, interval type-2 MFs allow for the handling of more decision/control uncertainty than traditional type-1 MFs.

An interval type-2 MF may be defined by an upper MF (UMF) and a lower MF (LMF). The UMF may be equivalent to a traditional type-1 MF and may be defined by a plurality of UMF parameters that are dependent on the type of MF. Similarly, the LMF may be equivalent to a traditional type-1 MF and may be defined by a plurality of LMF parameters that are dependent on the type of MF. The region between the UMF and LMF is known as the footprint of uncertainty (FOU) that allows each input value to be mapped to a plurality of different membership values.

With conventional techniques, the plurality of UMF parameters, the plurality of LMF parameters, and a scaling factor for the LMF may be independently tuned utilizing any of a variety of techniques (e.g., supervised learning) to adjust the FOU, such that a behavior of the FIS may be altered based on input/output training data that defines requirements or specifications of the FIS. Therefore, and with conventional techniques, 2n+1 number of parameters are tuned for each interval type-2 MF in the FIS to adjust the FOU and thus alter the behavior of the FIS, where n is the number of UMF parameters. The following table illustrates the number of parameters that are tuned utilizing conventional techniques for example different types of interval type-2 MFs:

| Type of interval type-2 MF | Number of Parameters to be Tuned (2n + 1) |
|---|---|
| Generalized bell | 7 |
| Gaussian | 5 |
| Combined Gaussian | 9 |
| Triangular | 7 |
| Trapezoidal | 9 |
| Sigmoid | 5 |
| Difference of sigmoids | 9 |
| Product of sigmoids | 9 |
| Z-shaped | 5 |
| Pi-shaped | 9 |
| S-shaped | 5 |

As an example, let it be assumed that a FIS has 9 inputs. In addition, let it be assumed that each input includes 4 triangular interval type-2 MF, such that n=3. Therefore, for this example, conventional techniques tune 252 parameters, i.e., 9*(4*(2n+1)), to adjust the FOUs for the interval type-2 MFs included in the FIS to alter the behavior of the FIS. As the number of inputs and the number of interval type-2 MFs increase in the FIS, the number of parameters to be tuned increases. In addition, and because the UMF parameters and the LMF parameters are tuned independently, conventional techniques have to validate that the LMF values are less than the UMF for each tuning iteration. Further, independently tuning the UMF parameters and the LMF parameters may result in a non-intuitive FOU, where, for example, a peak of the LMF is substantially off from a peak of the UMF.

Tuning the MFs to optimize the FOU for the FIS used in a real-world system in the conventional manner explained above can be computationally costly. For example, hierarchically connected FISs with type-1 MFs may be used to simulate an auto pilot system and may include many parameters. It may take, for example, approximately 80 to 100 hours to learn and tune the parameters such that the auto pilot system operates appropriately (avoid collisions, etc.) in the environment. With the inclusion of interval type-2 MFs, it can take even more time and computational resources to learn and tune the parameters to adjust the FOU.

Briefly, the present disclosure relates to systems and methods for generating a boundary of a FOU for an interval type-2 MF based on a transformation of another boundary of the FOU. Specifically, a process may receive parameters for a type-1 MF that defines a boundary of the FOU for an interval type-2 MF. For example, the type-1 MF may be an UMF that defines an upper boundary for the FOU. The process may also receive at least one parameter that is utilized to transform the UMF. The at least one parameter may include, but is not limited to, a scale parameter, a lag parameter, a shape scaling parameter, an offset parameter, or a hedge parameter. In an embodiment, the at least one parameter is a scale parameter and a lag parameter.

The process may generate, based on a transformation of UMF utilizing the at least one parameter, a type-1 MF, e.g., LMF, that defines a different boundary, e.g., lower boundary, of the FOU for the interval type-2 MF. When the at least one parameter is a scale parameter and a lag parameter, the process transforms the UMF to generate the LMF by scaling down the UMF by a factor equal to the scale parameter value and delaying the UMF such that the LMF starts to increase from zero on an x-axis where the UMF value(s) equal the lag parameter value(s). When the lag parameter is a single numerical value, the UMF is delayed symmetrically (symmetric lag). When the lag parameter is a vector of length two with two different values, the UMF is delayed asymmetrically (asymmetric lag). As such, the FOU for the interval type-2 MF is defined by a total number of parameters that equals the number of UMF parameters plus the number of the at least one parameter.

The process may adjust, i.e., tune, the UMF parameters and the at least one parameter to adjust the FOU for the interval type-2 MF such that the FIS operates in a manner based on, for example, available input/output training data that defines requirements or specifications for the FIS. Since the boundary, e.g., LMF, is generated based on the transformation of the boundary, e.g., UMF, the adjusting may be performed by the process without needing to consider the geometrical relationship between the and boundaries, and the adjusting may automatically maintain the geometrical relationship between the and boundaries.

The optimized interval type-2 MF may be part of a FIS that is included in an executable model that represents a real-world physical system. When executed in a computer-based modeling environment, the executable model may generate results representing a behavior of the real-world physical. For example, the executable model may represent a 2-wheeled robot that operates in a real-world, outdoor, unstructured environment, and the robot may include a type-2 fuzzy logic controller (e.g., FIS) that is constructed and tuned in accordance with the one or more embodiments described herein.

When the at least one parameter is the scale parameter and the lag parameter(s), the number of the at least one parameter is 2 for symmetric lag and the number of the at least one parameter is 3 for asymmetric lag. As such, according to one or more embodiments described herein, the total number of parameters tuned for each interval type-2 MF to adjust the FOU is either n+2 or n+3, where n is the number of UMF parameters. The following table illustrates the number of parameters that are tuned for the example different types of interval type-2 MFs utilizing a scale parameter and a lag parameter (symmetric lag and asymmetric lag) according to one or more embodiments described herein:

| Type of interval type-2 MF | Number of Parameters to be Tuned (n + 2) (Symmetric lag) | Number of Parameters to be Tuned (n + 3) (Asymmetric lag) |
| --- | --- | --- |
| Generalized bell | 5 | — |
| Gaussian | 4 | — |
| Combined Gaussian | 6 | 7 |
| Triangular | 5 | 6 |
| Trapezoidal | 6 | 7 |
| Sigmoid | 4 | — |
| Difference of sigmoids | 6 | 7 |
| Product of sigmoids | 6 | 7 |
| Z-shaped | 4 | — |
| Pi-shaped | 6 | 7 |
| S-shaped | 4 | — |

The "—" in the table above indicates that asymmetric lag does not exist for that particular type of interval type-2 MF.

As an example, let it be assumed that a FIS has 9 inputs. In addition, let it be assumed that each input includes 4 triangular interval type-2 MF, such that n=3. Therefore, one or more embodiments described herein tune 180 parameters, i.e., 9*(4*(n+2)), with symmetric lag and 216 parameters, i.e., 9*(4*(n+3)), with asymmetric lag to adjust the FOUs for the interval type-2 MFs included in the FIS to alter the behavior of the FIS.

Accordingly, one or more embodiments described herein tune a fewer number of parameters to adjust the FOU for each interval type-2 MF (e.g., n+2 or n+3) than conventional techniques (e.g., 2n+1). In addition, because the generation of a boundary is dependent upon another boundary, validation that the LMF values are less than the UMF values is not required during each tuning iteration according to one or more embodiments described herein. Therefore, computation resources of the underlying computer that implements the tuning are preserved according to one or more embodiments described herein. By preserving such computational resources, e.g., processing requirements, one or more embodiments describe herein provide an improvement to the underlying computer itself. In addition, by tuning a fewer number of parameters to adjust the FOU in, for example, a computer-based modeling environment, one or more embodiments described herein provide an improvement in the technological field of computer-based modeling for the design and creation of FISs.

FIG. 1 is a schematic, partial illustration of an example simulation environment 100 in accordance with one or more embodiments described herein. The simulation environment 100 may include a User Interface (UI) engine 102, a model editor 104, one or more model element libraries 106, a code generator 108, a compiler 110, a model execution engine 112, and a FIS generator 115 that includes a FIS optimizer 117 and a MF boundary generator 114. The UI engine 102 may create and present one or more User Interfaces (UIs), such as Graphical User Interfaces (GUIs) and/or Command Line Interfaces (CLIs), on the display of a workstation, laptop, tablet, or other data processing device. The GUIs and CLIs may provide a user interface to the simulation environment 100, such as a model editing window. Other GUIs and CLIs may be generated as user interfaces to the MF boundary generator 114. The one or more model element libraries 106 may contain model element types, at least some of which may come preloaded with the simulation environment 100, while others may be custom created and saved in the libraries 106, e.g., by a user. A user may select model element types from the libraries 106, and the model editor 104 may add instances of the selected model element types, e.g., blocks, to an executable model being created and/or edited. The model editor 104 may also perform selected operations on an executable model, such as open, create, edit, and save, in response to user inputs or programmatically.

The FIS generator 115 may construct and optimize the FIS in, for example, the simulation environment 100. The MF boundary generator 114 may generate a boundary (e.g., LMF) of a FOU for an interval type-2 MF included in a FIS based on a transformation of another boundary (e.g., UMF) of the FOU according to one or more embodiments described herein. Although FIG. 1 depicts the FIS generator 115 being included in the simulation environment 100, it is expressly contemplated that the FIS generator 115 may be independent and distinct from the simulation environment 100, and a tuned FIS may be imported or loaded into a portion of a model that is constructed in an external and different modeling/simulation environment.

The FIS optimizer 117 may include solvers 120a-120c that may tune MF parameters utilizing a tuning algorithm that includes, but is not limited to, neural networks, genetic algorithms, or a swarm method. For example, the solvers 120a-120c may tune the parameters of the FIS with machine learning (e.g., supervised learning) utilizing input/output training data that defines the requirements or specifications for the FIS. In each tuning iteration, an optimization method implemented by the solvers 120a-120c may generate multiple sets of solutions, which are values for selected parameters of the MFs of the FIS. The solvers 120a-120c may update the FIS with each solution and then evaluate the FIS using the input training data. The solvers 120a-120c may compare the evaluated output with the output training data to generate costs of the solution. The process may continue for multiple tuning iterations until a stop condition is met, and the solvers 120a-120c may select a minimum cost solution with tuned MF parameters.

The model execution engine 112 may include an interpreter 116, a model compiler 118, and one or more solvers, such as solvers 120a-120c. The model execution engine 112 may execute an executable model 132. The executable model 132 may represent a real-world physical system that includes a FIS, wherein the FIS includes at least one interval type-2 MF generated according to one or more embodiments described herein. In an embodiment, the executable model 132 may represent a decision process that is the FIS, for example the FIS may be a controller that when the inputs are x control action should be y. The simulation environment 100 may access the executable model 132, e.g., from a computer memory or transmitted from a local or remote device, etc., as indicated by arrow 134. The executable model 132 may be an executable graphical model (e.g., block diagram models, state-based models, discrete-event models, physical models, and combinations thereof) or an executable textual model. Execution of the executable model 132 may cause the FIS to execute and cause the generation of results representing a behavior of the real-world physical system or the decision process.

The model compiler 118 may include one or more Intermediate Representation (IR) builders, such as IR builder 122. The IR builder 122 may construct one or more IRs for the executable model 132 and these IRs may be used by the interpreter 116 to run, e.g., simulate or execute, the executable model 132. Alternatively or additionally, one or more of the IRs may be used by the code generator 108 to generate code. The IRs may be data structures that represent a graphical model. They may be stored in-memory and may be accessed by the model execution engine 112 and/or the code generator 108.

In some embodiments, the simulation environment 100 and/or the FIS generator 115 may be implemented through one or more software modules or libraries containing program instructions that perform the methods described herein, among other methods. The software modules may be stored in one or more memories, such as a main memory, a persistent memory, and/or a computer readable media, of a data processing device, and may be executed by one or more processors. Other computer readable media may also be used to store and execute these program instructions, such as one or more non-transitory computer readable media, including optical, magnetic, or magneto-optical media. In other embodiments, one or more of the simulation environment 100 and/or the FIS generator 115 may be implemented in hardware, for example through hardware registers and combinational logic configured and arranged to produce sequential logic circuits that implement the methods described herein. In other embodiments, various combinations of software and hardware, including firmware, may be utilized to implement the systems and methods of the present disclosure.

FIG. 1 is for illustrative purposes only and the present disclosure may be implemented in other ways. For example, in some embodiments, the FIS generator 115 may be included in the model execution engine 112 or another component or module. In addition, in some embodiments, the FIS optimizer 117 may be separate and distinct from the FIS generator 115.

Figure 2:
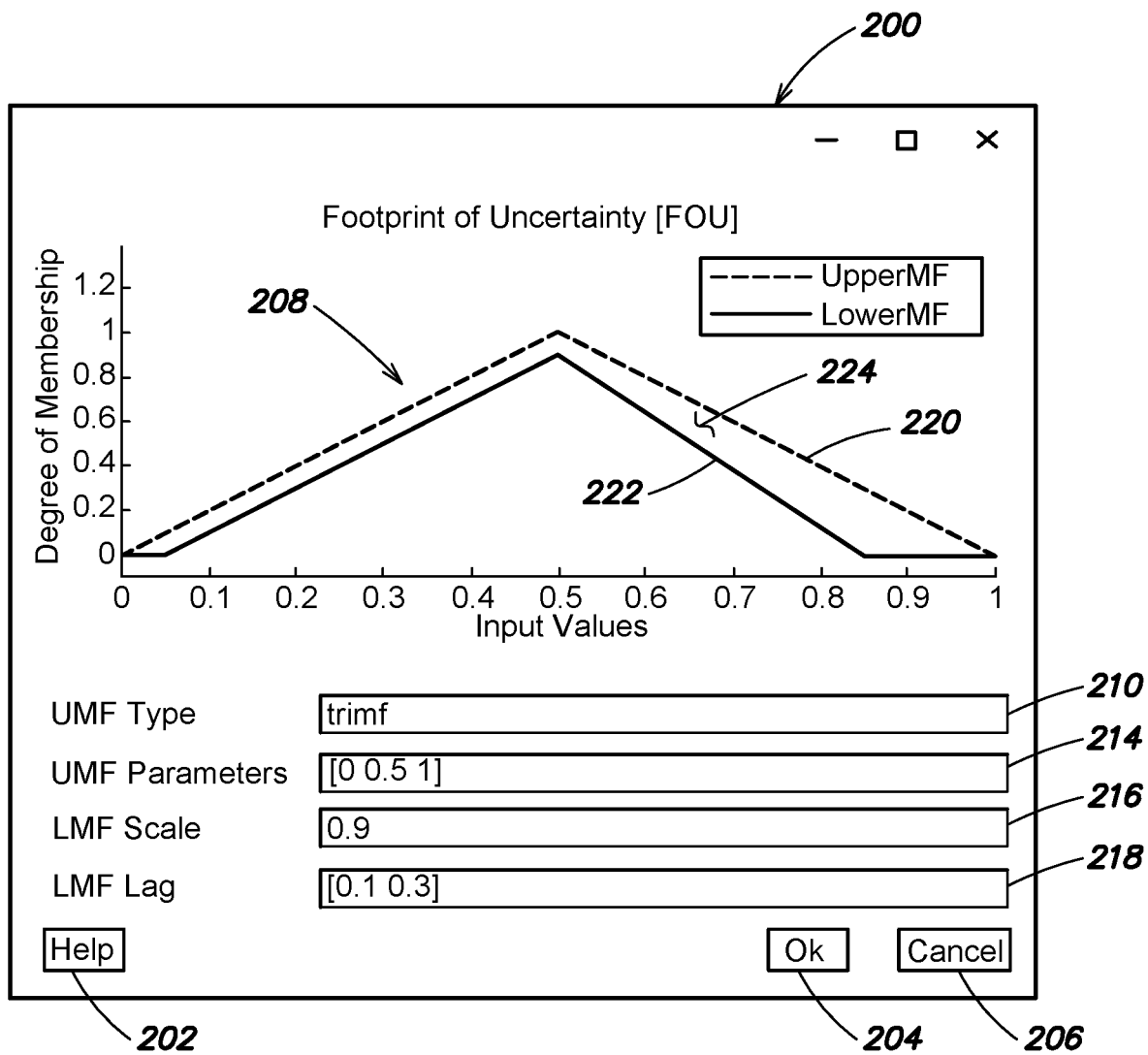
FIG. 2 is an illustration of an example user interface 200 for generating a boundary of a footprint of uncertainty for an interval type-2 MF based on a transformation of another boundary utilizing a scale parameter and a lag parameter in accordance with one or more embodiments described herein.

FIG. 2 is an illustration of an example user interface 200 for generating a boundary of a footprint of uncertainty for an interval type-2 MF based on a transformation of another boundary utilizing a scale parameter and a lag parameter in accordance with one or more embodiments described herein. The user interface 200 may be opened from within the simulation environment 100, and visually presented on a display of a data processing device or a different environment. For example, user interface 200 may allow a user to provide one or more inputs to generate and display an interval type-2 MF utilizing the scale parameter and the lag parameter. In an embodiment, user interface 200 is provided by the Fuzzy logic Toolbox™, from The MathWorks, Inc. of Natick, MA, that provides MATLAB® functions, apps, and a Simulink® block (fuzzy logic controller block) for analyzing, designing, and simulating fuzzy inference systems.

The user interface 200 may include a plurality of buttons for commonly used commands, such as a help button 202, an ok button 204, and a cancel button 206, among others. In response to the user selecting the ok button 204, the changes made in the user interface 200 may be saved by the simulation environment 100. In response to the user selecting the cancel button 206, the changes made in the user interface 200 may be discarded by the simulation environment 100.

The user interface 200 may be divided into a plot display portion and an input receiving portion. The plot display portion may display an interval type-2 MF 208 generated utilizing the scale parameter and the lag parameter according to one or more embodiments described herein. The y-axis may indicate the degree of membership for the interval type-2 MF 208 and the x-axis indicates the input values. The input receiving portion may include a plurality of fields that receive and store values from a user to generate a boundary of an interval type-2 MF based on a transformation of another boundary according to one or more embodiments described herein. The plurality of fields may include, but are not limited to, an UMF type field 210, an UMF parameters field 214, an LMF scale field 216, and an LMF lag field 218.

The UMF type field 210 may be a dropdown menu or a command line that allows the user to select or input a particular type (e.g., shape) of the UMF that corresponds to the type (shape) of the interval type-2 MF to be displayed in the display portion of the user interface 200. For example, the UMF type may include, but is not limited to, generalized bell-shaped MF ("gbellmf"), Gaussian MF ("gaussmf"), Gaussian combination MF, ("gauss2mf"), triangular MF ("trimf"), trapezoidal MF ("trapmf"), sigmoidal MF ("sigmf"), Difference between two sigmoidal MFs ("dsigmf"), product of two sigmoidal MFs ("psigmf"), z-shaped ("zmf"), pi-shaped MF ("pimf"), "s-shaped MF ("smf"), constant MF ("constant"), or linear MF ("linear").

In this example, "trimf" is stored in the UMF type field 210, indicating that the UMF 220 is triangular, and thus a triangular interval type-2 MF is to be displayed in display portion of user interface 200. In response to the selection of a type of UMF, the MF boundary generator 114 may populate the UMF parameters field 214, the LMF scale field 216, and the LMF lag field 218 with default values, or the fields may be left blank for user required input. The user may input values and/or edit values in fields 210, 214, 216, and 218 utilizing, for example, an input device such as a keyboard. The default values may, for example, be non-trivial values determined based on example FOUs available in fuzzy logic literature.

The UMF parameters field 214 may store a vector for the parameters of the UMF 220 that defines a boundary, e.g., UMF 220, of the FOU 224 for the interval type-2 MF 208. The length of the parameter vector may depend on the type of the UMF. In this example, the type is a triangular UMF. As such, the length of the parameter vector is three. In addition, and in this example, a vector of [0 0.5 1] is stored in the UMF parameters field 214 indicating that the support values for the UMF 220 are at 0 and 1 on the x-axis and the peak value is at 0.5 on the x-axis. As depicted in the plot display portion, the UMF 220 starts increasing from zero at the support values of 0 and 1 on the x-axis and has its peak value at 0.5 on the x-axis.

The LMF scale field 216 may store a scale parameter value that is a positive numerical value that is less than or equal to 1. The MF boundary generator 114 may use the scale parameter value to scale down and transform the UMF 220 to define a maximum value of the LMF 222. In this example, the value of 0.9 is stored in the LMF scale field 216. As such, the MF boundary generator 114 may multiply the maximum UMF 220 value, e.g., 1, by the scale parameter value of 0.9 to scale down and transform the UMF 220. Based on the multiplication, the maximum value of the LMF 222 is 0.9. In an embodiment, the default value for the scale parameter may be 1. If the scale parameter is 1, the maximum value of the LMF 222 is equal to the maximum value of the UMF 220. In an embodiment, and when the at least one parameter is only the scale parameter without a lag parameter, the MF boundary generator 114 may transform the UMF 220 to generate the LMF 222 by multiplying all the UMF 220 values by the scale parameter value.

The LMF lag field 218 may store a lag parameter value that is a numeric scalar value or vector of length two. The lag parameter value may be a value between 0 and 1, inclusive. The lag parameter value may represent a delay in the LMF 222 values relative to the UMF 220. Specifically, the lag parameter value may define the point(s) on the x-axis at which the LMF 222 values starts increasing from zero, where the points on the x-axis correspond to where the UMF 220 value(s) equals the lag parameter value(s). In this example, a vector of [0.1 0.3] is stored in the LMF lag field 218 indicating asymmetric lag, e.g., left side lag of 0.1 and right side lag of 0.3. To further transform the UMF 220 to generate the LMF 222, the MF boundary generator 114 starts the LMF 222 to increase from zero (i.e., becomes positive) on the left side at 0.5 on the x-axis (Input values) where the UMF 220 value is equal to 0.1. In addition, the MF boundary generator 114 starts the LMF 222 to increase from zero on the right side at 8.5 on the x-axis where the UMF value is equal to 0.3. It is noted that if the LMF lag field 218 stores a numeric scalar value indicating symmetric lag, the LMF 222 would start increasing from zero on both sides on the x-axis where the UMF 220 values are equal to the numerical scalar value. When a lag parameter value is 0, the LMF 222 starts increasing from zero at the same point(s) as the UMF 220. In an embodiment, the default value for the lag parameter is a vector of [0.2 0.2] or a numeric scalar value of 0.2. In an alternative embodiment, the default value for the lag parameter is a vector of [0.0 0.0] or a numeric scalar value of 0.

As depicted in the plot portion of the user interface 200, the LMF 222 is generated, by the MF boundary generator 114, based on the transformation of the UMF 220 utilizing the scale parameter value and the lag parameter values. Specifically, the MF boundary generator 114 transforms the UMF 220 to generate the LMF 222 that starts increasing at 0.5 and 8.5 on the x-axis based on the lag parameter values of 0.1 and 0.3, and is scaled down relative to the UMF 220 values based on the scale parameter of 0.9. As such, the FOU 224 for the interval type-2 MF 208 is defined utilizing a total of 6 parameters, e.g., the 3 UMF parameters, the 2 lag parameter values, and the 1 scale parameter value (n+3, where n is the number of UMF parameters). Thus, a total of 6 parameters are tuned to adjust the FOU for the interval type-2 MF 208 as depicted in FIG. 2. If the lag parameter value is a numeric scalar value, the FOU for the symmetric interval type-2 MF is defined utilizing a total 5 parameters, e.g., the 3 UMF parameters, the 1 lag parameter value, and the 1 scale parameter value (n+2, where n is the number of UMF parameters). Thus, a total of 5 parameters are tuned to adjust the FOU for a symmetric triangular interval type-2 MF.

As such, one or more embodiments described herein tune a fewer number of parameters (e.g., n+2 or n+3) to adjust the FOU 224 for each interval type-2 MF than conventional techniques (e.g., 2n+1). In addition, because the generation of the LMF 222 is dependent on the UMF 220, validation that the LMF 222 values are less than the UMF 220 values is not required according to one or more embodiments described herein.

Although the user interface 200 of FIG. 2 is a GUI, it is expressly contemplated that the user interface 200 may be a CLI. In an embodiment, the CLI is provided by the Fuzzy logic Toolbox™ from The MathWorks, Inc. of Natick, MA For example, a user may input commands into the CLI to create a FIS that includes the interval type-2 MF 208 of FIG. 2. Specifically, the following commands may create a Sugeno FIS, add an input variable to the FIS named "Input values" that has values from 0 to 1, add a triangular interval type-2 MF named "mf" to the FIS, define the parameters of the UMF 220 for the triangular interval type 2-MF, define the scale parameter, and define the lag parameters:

fis=sugfistype2;
fis=addInput(fis, [0 1], 'Name', 'Input values');
fis=addMF (fis, 'Input values', 'trimf', [0 0.5 1], 'Name', 'mf', 'LowerScale', 0.9, 'LowerLag', [0.1 0.3]);

The FIS generator 115 may utilize information contained in the above commands to generate the interval type-2 MF 208 as depicted in FIG. 2, and the MF boundary generator 114 may utilize information contained in the above commands to generate the LMF utilizing the specific lag and scale parameters. It should be understood that if the user does not provide the scale parameter value and/or the lag parameter value(s), the MF boundary generator 114 may utilize a default scale parameter value and/or default lag parameter value(s).

To plot the interval type-2 MF 208 via the CLI such that the interval type-2 MF 208 is displayed in, for example, the simulation environment 100, the user may enter the following commands:

plotmf (fis, 'Input values', 1)
title ('Footprint of Uncertainty (FO)')

It should be understood that because of their shape, generalized bell shaped interval type-2 MF, Gaussian shaped interval type-2 MF, sigmoidal shaped interval type-2 MF, z-shaped interval type-2 MF, or s-shaped interval type-2 MF may utilize only a scalar lag parameter value. In addition, it should be understood that the lag parameter value may be less than 1 for particular types of interval type-2 MF. For example, the lag parameter may be less than 1 for generalized bell shaped interval type-2 MF, Gaussian shaped interval type-2 MF, sigmoidal shaped interval type-2 MF, difference between two sigmoidal shaped interval type-2 MF, and a pi-shaped interval function.

Figure 3:
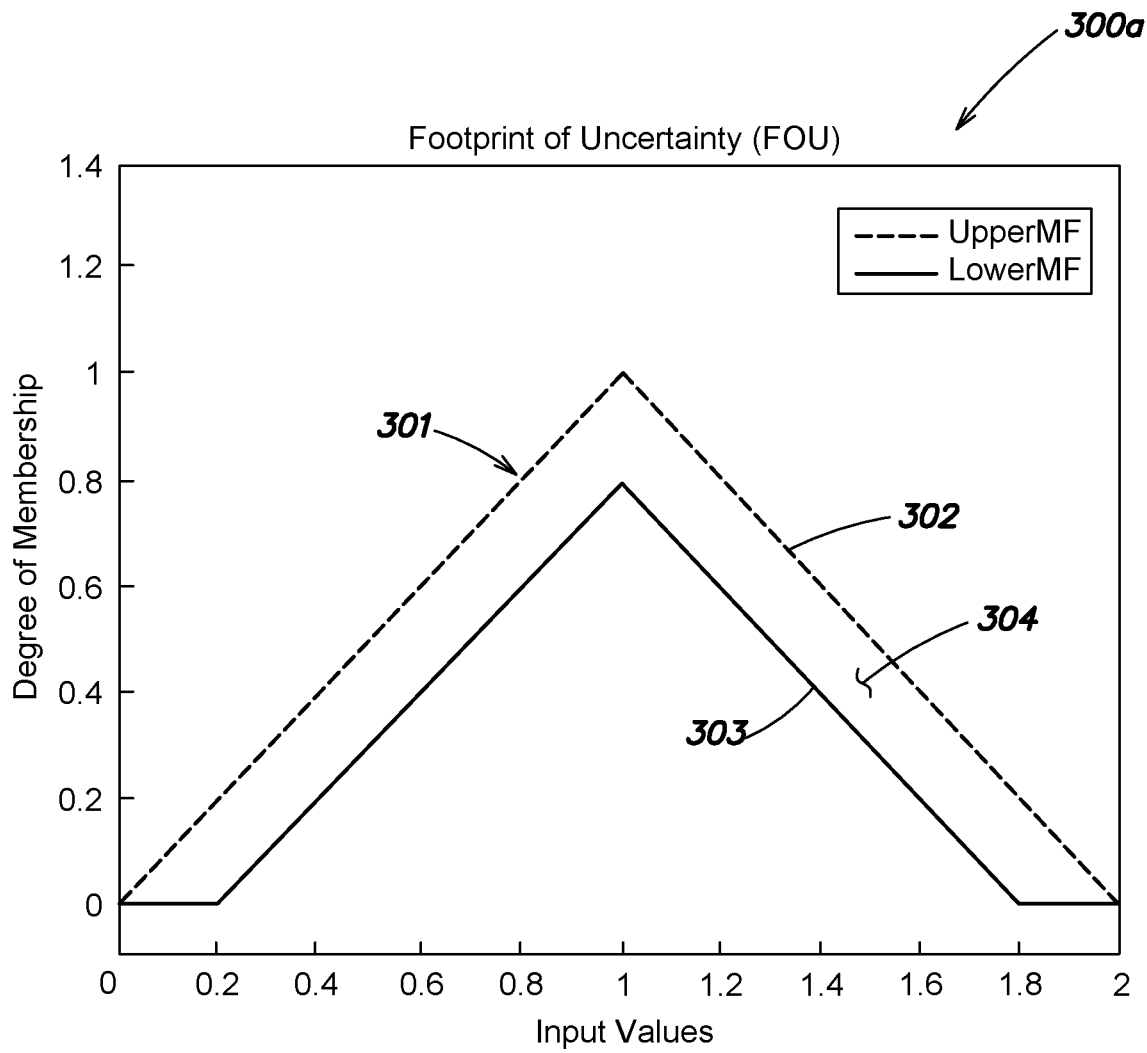
FIG. 3 is an illustration of an example plot of an interval type-2 MFs with a boundary of a footprint of uncertainty generated based on a transformation of another boundary utilizing a shape scaling parameter in accordance with one or more embodiments described herein.

FIG. 3 is an illustration of an example plot of an interval type-2 MFs with a boundary of a footprint of uncertainty generated based on a transformation of another boundary utilizing a shape scaling parameter in accordance with one or more embodiments described herein. As depicted in FIG. 3, the plot 300a includes an interval type-2 MF 301 that is triangular, where the y-axis indicates the degree of membership for the interval type-2 MF 301 and the x-axis indicate the input values. The interval type-2 MF 301 includes an UMF 302 and LMF 303. The UMF 302 has parameters [0 1 2], indicating that the support values for the UMF 302 are at 0 and 2 on the x-axis and the peak value is at 1 on the x-axis. In addition, the shape scaling parameter in this example is a numerical value of 0.2. The UMF 302 parameters and the shape scaling parameter may be provided by a user via the user interface 200, a CLI, or may be default values provided by the MF boundary generator 114 as described above with reference to FIG. 2. For example, an LMF shape scaling parameter field (not shown) may be included in the user interface 200 instead of the LMF scale field 216 and LMF lag field 218.

The shape scaling parameter may be a value that represents an amount that the support values of the UMF 302 are scaled down along the x-axis and an amount the peak value of the UMF 302 is scaled down along the y-axis. The MF boundary generator 114 may utilize the shape scaling parameter with the UMF 302 parameters to transform the UMF 302 to generate the LMF 303. In this example, the MF boundary generator 114 scales down the peak value of 1 by the shape scaling parameter value of 0.2 such that the peak value of the LMF 303 is at 0.8 on the y-axis, and scales the supports values of 0 and 2 horizontally by the shape scaling parameter value of 0.2 such that the LMF 303 has its support values at 0.2 and 1.8 on the x-axis as depicted in FIG. 3.

As such, the FOU 304 for the interval type-2 MF 301 is defined utilizing a total of 4 parameters, e.g., the 3 UMF parameters and the 1 shape scaling parameter (n+1, where n is the number of UMF parameters). Thus, a total of 4 parameters are tuned to adjust the FOU 304 for the interval type-2 MF 301 as depicted in FIG. 3.

Figure 4A:
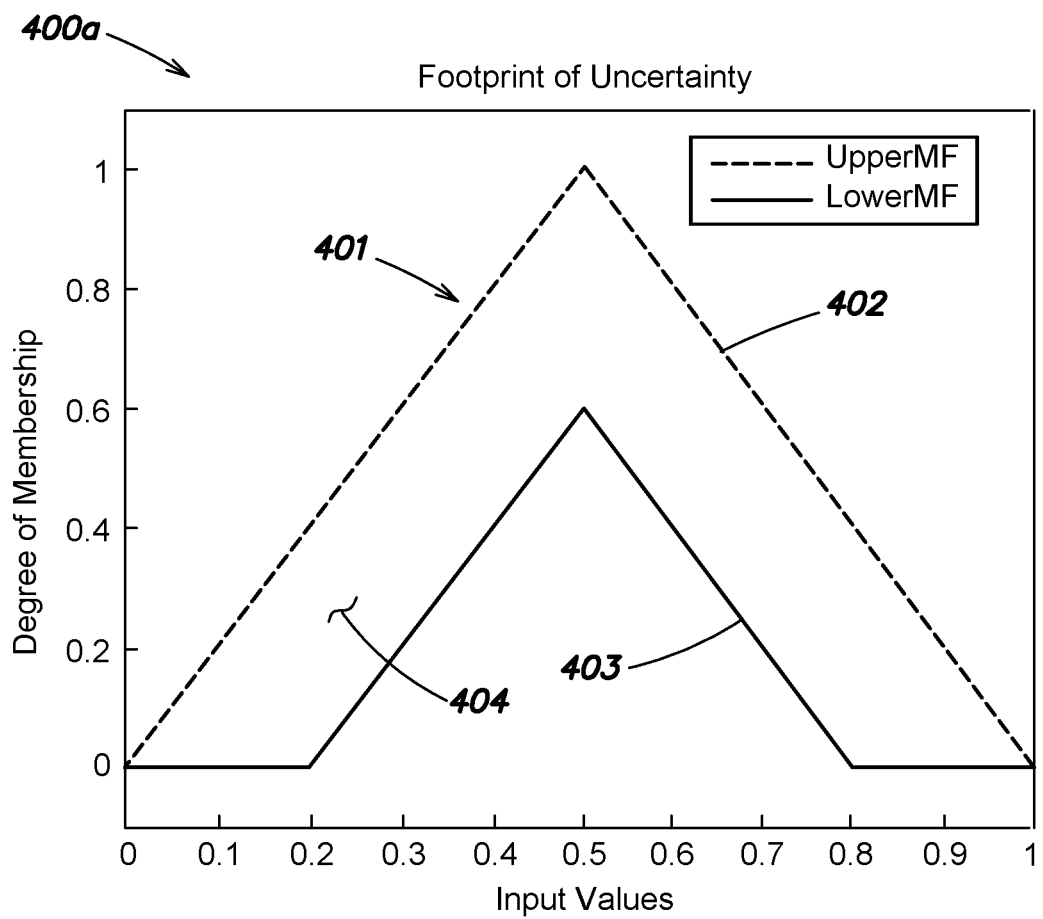
FIGS. 4A and 4B are illustrations of example plots of interval type-2 MFs with boundaries of footprints of uncertainty generated based on transformations of other boundaries utilizing an offset parameter in accordance with one or more embodiments described herein.
Figure 4B:
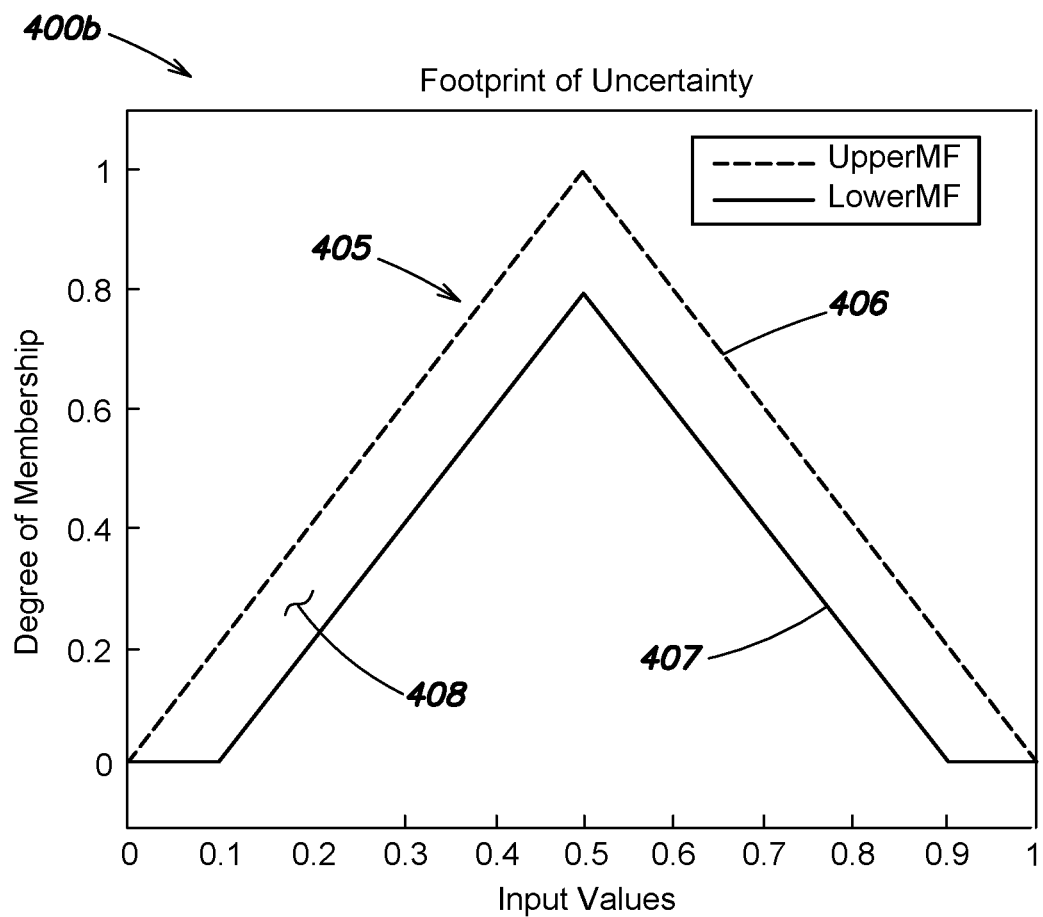

FIGS. 4A and 4B are illustrations of example plots of interval type-2 MFs with boundaries of footprints of uncertainty generated based on transformations of other boundaries utilizing an offset parameter in accordance with one or more embodiments described herein. As depicted in FIG. 4A, the plot 400a includes an interval type-2 MF 401 that is triangular, where the y-axis indicates the degree of membership for the interval type-2 MF 401 and the x-axis indicates the input values. The interval type-2 MF 401 includes an UMF 402 and LMF 403. The UMF 402 has parameters [0 0.5 1], indicating that the support values for the UMF 402 are at 0 and 1 on the x-axis and the peak value is at 0.5 on the x-axis. In addition, the offset parameter is a numeric value of 0.2. The UMF 402 parameters and the offset parameter may be provided by a user via the user interface 200, a CLI, or may be default values provided by the MF boundary generator 114 as described above with reference to FIG. 2. For example, an LMF offset parameter field (not shown) may be included in the user interface 200 instead of the LMF scale field 216 and LMF lag field 218.

The offset parameter may indicate an amount the UMF 402 is shifted horizontally in each direction. The MF boundary generator 114 may utilize the offset parameter to transform the UMF 402 to generate the LMF 403. Specifically, the MF boundary generator 114 may equally shift the UMF 401 on the left and right side by an amount of 0.2 to respectively generate a shifted MF and a different shifted MF, and then select minimum values of UMF 402 and the two shifted MFs at each point on the x-axis to generate the LMF 403 as depicted in FIG. 4A.

As such, the FOU 404 for the interval type-2 MF 401 is defined utilizing a total of 4 parameters, e.g., the 3 UMF 402 parameters and the 1 offset parameter (n+1, where n is the number of UMF parameters). Thus, a total of 4 parameters are tuned to adjust the FOU 404 for the interval type-2 MF 401 as depicted in FIG. 4A.

As depicted in FIG. 4B, the plot 400b includes an interval type-2 MF 405 that is triangular, where the y-axis indicates the degree of membership for the interval type-2 MF 405 and the x-axis indicates the input values. The interval type-2 MF 405 includes an UMF 406 and an LMF 407. The UMF 406 has parameters [0 0.5 1], indicating that the support values for the UMF 406 are at 0 and 1 on the x-axis and the peak value is at 0.5 on the x-axis. In addition, the offset parameter is a numerical value of 0.2.

The offset parameter may indicate an amount the UMF 406 is shifted down vertically. The MF boundary generator 114 may utilize the offset parameter to transform the UMF 406 to generate the LMF 407. Specifically, the MF boundary generator 114 may vertically shift down the UMF 406 by subtracting the offset value of 0.2 from each of the values of the UMF 406 to generate the LMF 407 as depicted in FIG. 4B. The negative values based on the subtraction may be saturated to 0.

As such, the FOU 408 for the interval type-2 MF 405 is defined utilizing a total of 4 parameters, e.g., the 3 UMF parameters and the 1 offset parameter for down shifting (n+1, where n is the number of UMF parameters). Thus, a total of 4 parameters are tuned to adjust the FOU 408 for the interval type-2 MF 405 as depicted in FIG. 4B.

Figure 5:
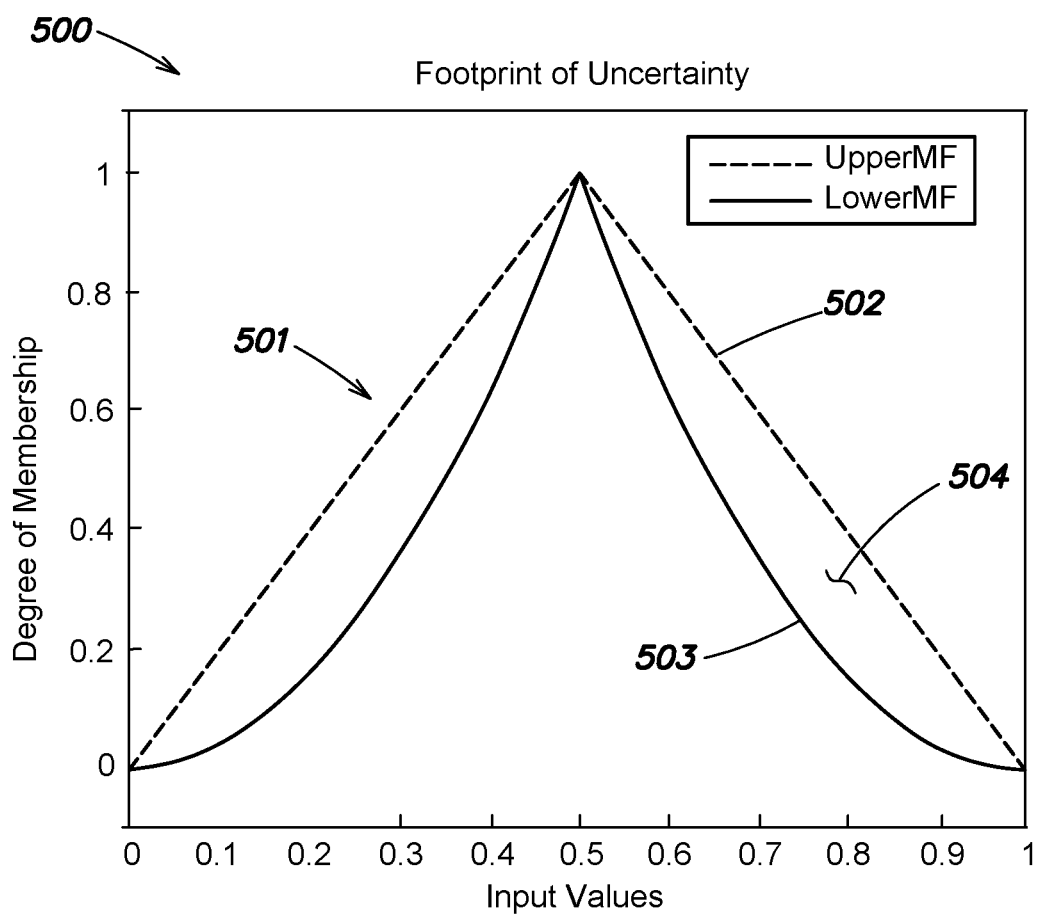
FIG. 5 is an illustration of an example plot of an interval type-2 MF with a boundary of a footprint of uncertainty generated based on a transformation of another boundary utilizing a hedge parameter in accordance with one or more embodiments described herein.

FIG. 5 is an illustration of an example plot of an interval type-2 MF with a boundary of a footprint of uncertainty generated based on a transformation of another boundary utilizing a hedge parameter in accordance with one or more embodiments described herein. As depicted in FIG. 5, the plot 500 includes an interval type-2 MF 501 that is triangular, where the y-axis indicates the degree of membership for the interval type-2 MF 501 and the x-axis indicates the input values. The interval type-2 MF 501 includes an UMF 502 and LMF 503. The UMF 502 has parameters [0 0.5 1], indicating that the support values for the UMF 502 are at 0 and 1 on the x-axis and the peak value is at 0.5 on the x-axis. In addition, the hedge parameter is a value of 2. The UMF 502 parameters and the hedge parameter may be provided by a user via the user interface 200, a CLI, or may be default values provided by the MF boundary generator 114 as described above with reference to FIG. 2. For example, an LMF hedge parameter field (not shown) may be included in the user interface 200 instead of the LMF scale field 216 and LMF lag field 218.

The hedge parameter may be a value that is greater than 1 and represent an exponent indicating a power to which the UMF 502 values are raised (i.e., the hedge parameter may represent the number of times a UMF value is used in a multiplication). The MF boundary generator 114 may utilize the hedge parameter to transform the UMF 502 to generate the LMF 503. Specifically, the MF boundary generator 114 may transform the UMF 502 by multiplying each UMF 502 value 2 times (e.g., (UMF value)$^n$, where n is the hedge parameter value) to generate the LMF 503 as depicted in FIG. 5.

As such, the FOU 504 for the interval type-2 MF 501 is defined utilizing a total of 4 parameters, e.g., the 3 UMF 502 parameters and the 1 hedge parameter (n+1, where n is the number of UMF parameters). Thus, a total of 4 parameters are tuned to adjust the FOU 504 for the interval type-2 MF 501 as depicted in FIG. 5.

It should be understood that the description of a triangle shaped interval type-2 MF with particular values for the parameters (e.g., UMF parameters, scale parameter, lag parameter, shape scaling parameter, offset parameter, hedge parameter) is for illustrative purposes only, and that it is expressly contemplated that one or more embodiments described herein may be utilized with other types of (shapes) interval type-2 MFs and values. In addition, it should be understood that the description of generating the LMF based on the transformation of the UMF is for illustrative purposes only, and it is expressly contemplated that one or more embodiments described herein may generate the UMF based on the transformation of the LMF in a similar manner. For example, the MF boundary generator 114 may receive a plurality of parameters that define the LMF 222 and the scale parameter and the lag parameter. The MF boundary generator 114 may generate the UMF 220 based on a transformation of the LMF 222 utilizing the scale parameter and the lag parameter according to one or more embodiments described herein.

Any of the parameters described herein, e.g., UMF parameters and at least one parameter (e.g., lag parameter, scale parameter, shape scaling parameter, offset parameter, and/or hedge parameter), may be tuned to adjust the FOU for each MF and thus alter the behavior of the FIS. Specifically, the solvers 120a-120c may tune MF parameters utilizing a tuning algorithm that includes, but is not limited to, neural networks, genetic algorithms, or a swarm method. For example, the solvers 120a-120c may tune the parameters, e.g., UMF parameters, lag parameter, and scale parameter, with machine learning (e.g., supervised learning) utilizing input/output training data that defines the requirements or specifications of the FIS. In each tuning iteration, an optimization method implemented by the solvers 120a-120c may generate multiple sets of solutions, which are values for the selected parameters of the MFs of the FIS. The solvers 120a-120c may update the FIS with each solution and then evaluate the FIS using the input training data. The solvers 120a-120c may compare the evaluated output with the output training data to generate costs of the solution. The process may continue for multiple tuning iterations until a stop condition is met, and the solvers 120a-120c may select a minimum cost solution with tuned MF parameters. By tuning the parameters, e.g., UMF parameters, lag parameter, and scale parameter, desired behavior of the FIS that correlates to the training input/output data is achieved.

Figure 6:
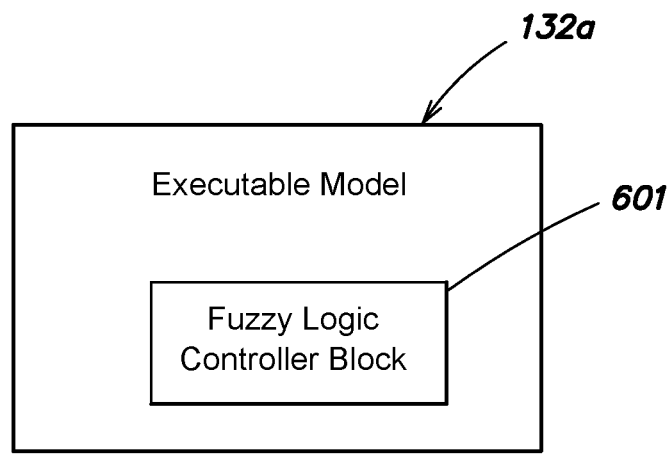
FIG. 6 is an illustration of an example executable model representing a real-world physical system that uses/implements a tuned or optimized FIS constructed and tuned in accordance with one or more embodiments described herein.

FIG. 6 is an illustration of an example executable model representing a real-world physical system that uses/implements a tuned or optimized FIS constructed and tuned in accordance with one or more embodiments described herein. The executable model 132a may represent a 2-wheeled robot that operates (e.g., moves) in a real-world, outdoor, unstructured environment. This outdoor environment may provide various sources of uncertainty not present in indoor environments, ranging from wind and significant differences in humidity to small debris such as leaves and small stones. As such, the robot may include a type-2 fuzzy logic controller (e.g., FIS) that has two sonar sensors as inputs that provide distance information to objects in the environment, where each sensor is represented by two triangle type-2 MF that are utilized to deal with the uncertainty as described above. In addition, the output for the fuzzy logic controller may be the speed difference between the left and right wheel of the robot and thus, the turning angle such that the robot can operate/move unobstructed in the environment (e.g., not collide with walls, etc.).

The fuzzy logic controller block 601 of the executable model 132a as depicted in FIG. 6 may represent the fuzzy logic controller of the robot. In an embodiment, the fuzzy logic controller block 601 is the fuzzy logic controller block of the Simulink® simulation environment. Thus, the executable model 132a, with the fuzzy logic controller block 601, may be executed in the simulation environment 100 to simulate the behavior (e.g., movement) of the robot.

In this example, each of the two triangular interval type-2 MFs, representing each of the two input sensors, is symmetric and generated based on the transformation of the UMF utilizing the scale and lag parameter according to one or more embodiments described herein. Thus, each triangular interval type 2-MF is defined by a total of 5 parameters, e.g., 3 UMF parameters, scale parameter, and lag parameter. Accordingly, a total of 20 parameters (e.g., 2 inputs with 2

MFs each having 5 parameters) are tuned to adjust the FOUs to alter the simulated behavior, e.g., simulated movement, of the robot in the simulation environment 100. Specifically, the one or more solvers 120a-120c may implement a tuning algorithm, e.g., supervised learning with training input/output data, in the simulation environment 100 to tune the 20 parameters to adjust the FOUs for the fuzzy logic controller block 601 representing the fuzzy logic controller of the robot such the robot operates in a real-world, outdoor, unstructured environment without colliding with walls, obstructions, etc.

In accordance with one or more embodiments described herein, the time needed to tune parameters for a symmetrical, triangular interval type-2 MFs may be approximately 50% less (e.g., 33% for reduced number of parameters and 25% for not having to validate that the LMF values are less than the UMF values) than the time needed to tune the parameters according to conventional approaches where the UMF parameters and the LMF parameters are tuned independently. By preserving such computational resources, e.g., processing requirements, one or more embodiments describe herein provide an improvement to the underlying computer itself. In addition, by tuning a fewer number of parameters to adjust the FOU in, for example, a computer-based modeling environment, one or more embodiments described herein provide an improvement in the technological field of computer-based modeling for the design and creation of FIS.

The model execution engine 112 may execute the executable model 132 in the simulation environment 100 to simulate the behavior/movement of the robot. If the simulated behavior, i.e., simulated movement, indicates improper/incorrect behavior, e.g., the robot will collide and/or will not handle the uncertainty when operating in the outdoor environment, the parameters of the MFs may be further tuned with additional training data until desired behavior (e.g., the robot will not collide with obstructions and/or walls in the unstructured environment) is achieved (i.e., optimization) based on input/output training data. If the simulated behavior indicates proper/correct behavior, the code generator 108 may generate code (e.g., C code) for the executable model 132a, and the generated code may be deployed at a target system, e.g., a microcontroller of the robot, such that robot's behavior in the unstructured real-world environment corresponds to the simulated behavior verified in the simulation environment 100. Although reference is made to a robot utilizing a FIS (e.g., fuzzy logic controller) constructed and tuned according to the one or more embodiments described herein, it is expressly contemplates that a FIS constructed and tuned according to the one or more embodiments described herein may be utilized with different systems. For example, such systems may include, but are not limited to, the controlling and steering of systems and complex industrial processes, Wireless Sensor Networks, systems for household and entertainment electronics, systems for other expert systems and applications like the classification of Synthetic-aperture radar (SAR) data, etc.

Figure 7:
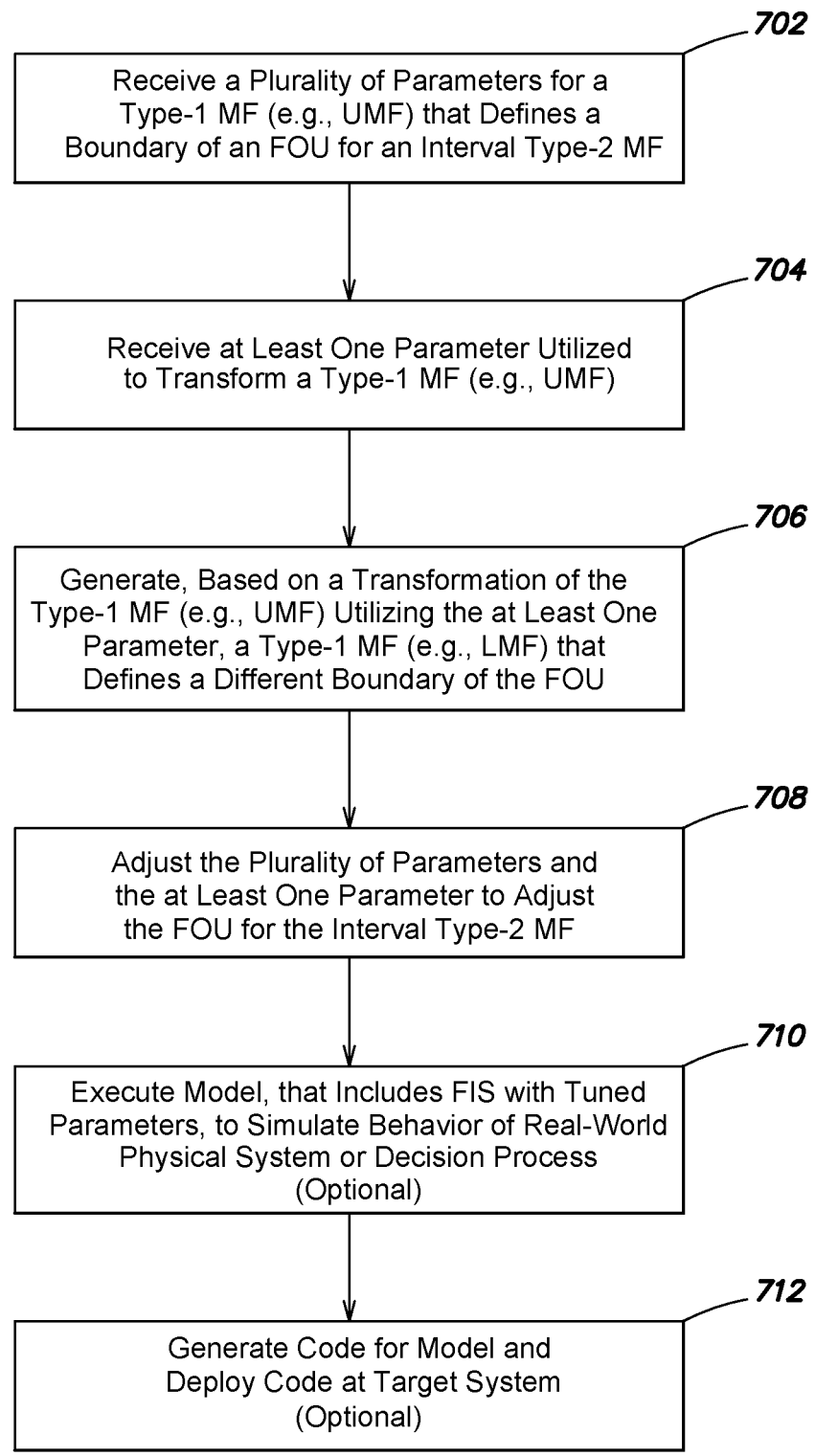
FIG. 7 is a flow diagram of an example method for generating a boundary of a footprint of uncertainty for an interval type-2 MF based on a transformation of another boundary in accordance with one or more embodiments described herein.

FIG. 7 is a flow diagram of an example method for generating a boundary of a FOU for an interval type-2 MF based on a transformation of another boundary in accordance with one or more embodiments described herein.

The MF boundary generator 114 may receive a plurality of parameters for a type-1 MF that defines a boundary of a FOU for an interval type-2 MF at block 702. For example, the type-1 MF may be an UMF of the interval type-2 MF. In an embodiment, the plurality of parameters may be received via the user interface 200 or via a CLI. In an alternative embodiment, the plurality of parameters may be default values. For example, and in response to a selection of a type of a UMF from UMF type field 210, the MF boundary generator 114 may utilize default values for the parameters of the UMF.

The MF boundary generator 114 may receive at least one parameter that is utilized to transform the type-1 MF at block 704. The at least one parameter may include, but is not limited to, a scale parameter, a lag parameter, a shape scaling parameter, an offset parameter, or a hedge parameter. In an embodiment, the at least one parameter is a scale parameter and a lag parameter. In an embodiment, the at least one parameter may be received via the user interface 200 or via a CLI. In an alternative embodiment, the at least parameter may be a default value. For example, and in response to a selection of a type of a UMF from field 210, the MF boundary generator 114 may utilize default values for the scale parameter and lag parameter.

The MF boundary generator 114 may generate, based on a transformation of the type-1 MF utilizing the at least one parameter, a type-1 MF that defines a different boundary of the FOU for the interval type-2 MF at block 706. In an embodiment, the at least one parameter is a scale parameter and a lag parameter(s). When the at least one parameter is a scale parameter and a lag parameter(s), the MF boundary generator 114 transforms the UMF to generate the LMF by scaling down the UMF by a factor equal to the scale parameter value and delaying the UMF such that the LMF starts to increase from zero on an x-axis where UMF value(s) equal the lag parameter value(s). When the lag parameter is a single numerical value, the UMF is delayed symmetrically (symmetric lag). When the lag parameter is a vector of length two with different values, the UMF is delayed asymmetrically (asymmetric lag). As such, the FOU for the interval type-2 MF is defined with a total number of parameters that equals the number of UMF parameters plus the number of the at least one parameter (e.g., n+2 or n+3, where n is the number of UMF parameters).

The one or more solvers 120a-120c may adjust, i.e., tune, the plurality of parameters that define the type-1 MF and the at least one parameter to adjust the FOU for the interval type-2 MF until optimized based on available input/output training data such that desired behavior is achieved at block 708. Specifically, the one or more solvers 120a-120c may implement a tuning algorithm with machine learning (e.g., supervised learning) utilizing, for example, input/output training data to tune the parameters of the MFs such that the output of the FIS correlates to the input/output training data. The one or more solvers 120a-120c may tune the parameters as a background process in the simulation environment 100 or based on one or more input commands received by a user via a user interface in the simulation environment 100. The optimized interval type-2 MF may be part of a FIS that is included in an executable model 132 that represents a real-world physical system.

The model execution engine 112 may optionally execute the executable model 132, which includes the FIS with the tuned parameters, to simulate a behavior of the real-world physical system or a decision process at block 710. For example, the model execution engine 112 may execute the executable model 132 in simulation environment 100 such that results are generated representing the behavior of the real-world physical system or the decision process. The code generator 108 may optionally generate code (e.g., C code) for the executable model 132 and the generated code may be deployed at a target system at block 712. The generated code 146 may conform to one or more programming languages, such as Ada, Basic, C, C++, C#, SystemC, FORTRAN, etc.

or to a hardware description language, such as VHDL, Verilog, a vendor or target specific HDL code, such as Xilinx FPGA libraries, assembly code, etc. In addition, the target system may be a real-world physical system that includes, but is not limited to, the controlling and steering of systems and complex industrial processes, Wireless Sensor Networks, systems for household and entertainment electronics, systems for other expert systems and applications like the classification of Synthetic-aperture radar (SAR) data, etc.

Exemplary simulation environments 100 suitable for use with the present disclosure include the MATLAB® language/programming environment and the Simulink® simulation environment both from The MathWorks, Inc. of Natick, MA, as well as the Simscape™ physical modeling system, the SimEvent® discrete-event modeling tool, and the Stateflow® state chart tool also from The MathWorks, Inc., the MapleSim physical modeling and simulation tool from Waterloo Maple Inc. of Waterloo, Ontario, Canada, the LabVIEW virtual instrument programming system and the NI MatrixX model-based design product both from National Instruments Corp. of Austin, TX, the Visual Engineering Environment (VEE) product from Keysight Technologies Inc. of Santa Rosa, CA, the System Studio model-based signal processing algorithm design and analysis tool and the SPW signal processing algorithm tool from Synopsys, Inc. of Mountain View, CA, a Unified Modeling Language (UML) system, a Systems Modeling Language (SysML) system, the System Generator system from Xilinx, Inc. of San Jose, CA, the Modelica environment from the Modelica Association, and the Rational Rhapsody Design Manager software from IBM Corp. of Somers, NY.

Exemplary code generators include, but are not limited to, the Simulink Coder, the Embedded Coder, and the Simulink HDL Coder products from The MathWorks, Inc. of Natick, MA, and the TargetLink product from dSpace GmbH of Paderborn, Germany.

The generated code may be textual code, such as textual source code, that may be compiled, for example by the compiler 110, and executed on a target machine or device, which may not include a simulation environment and/or a model execution engine. The generated code may conform to one or more programming languages, such as Ada, Basic, C, C++, C#, SystemC, FORTRAN, etc. or to a hardware description language, such as VHDL, Verilog, a vendor or target specific HDL code, such as Xilinx FPGA libraries, assembly code, etc. The compiler 110 may compile the generated code for execution by a target processor, such as a microprocessor, a Digital Signal Processor (DSP), a single or multi-core Central Processing Unit (CPU), a Graphics Processor (GPU), etc. In some embodiments, the generated code may be accessed by a hardware synthesis tool chain, which may configure, e.g., synthesize, a programmable hardware device, such as a Field Programmable Gate Array (FPGA), a Complex Programmable Logic Device (CPLD), a System on a Chip (SoC), etc., from the generated code. The executable model 132 and the generated code may be stored in memory, e.g., persistent memory, such as a hard drive or flash memory, of a data processing device.

The simulation environment 100 may be loaded into and run from the main memory of a data processing device.

In some implementations, the code generator 108 and/or the compiler 110 may be separate from the simulation environment 100, for example one or both of them may be separate application programs. The code generator 108 and/or the compiler 110 may also be run on different data processing devices than the data processing device running the simulation environment 100. In such embodiments, the code generator 108 may access the executable model 132, e.g., from memory, and generate the generated code without interacting with the simulation environment 100.

Figure 8:
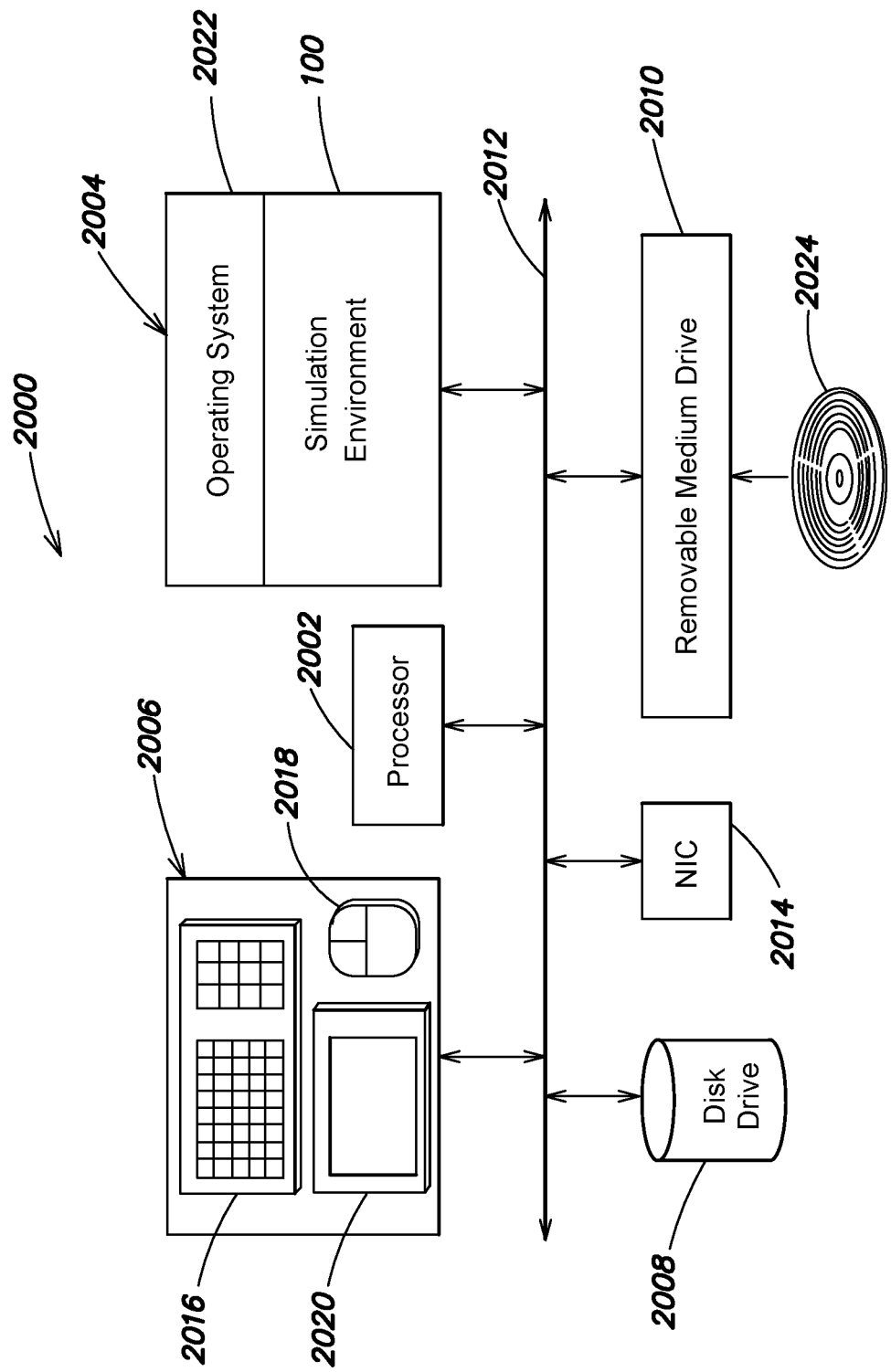
FIG. 8 is a schematic illustration of a data processing system for implementing one or more embodiments described herein.

FIG. 8 is a schematic illustration of a computer or data processing system 2000 for implementing one or more embodiments described herein. The computer system 2000 may include one or more processing elements, such as a processor 2002, a main memory 2004, user input/output (I/O) 2006, a persistent data storage unit, such as a disk drive 2008, and a removable medium drive 2010 that are interconnected by a system bus 2012. The computer system 2000 may also include a communication unit, such as a network interface card (NIC) 2014. The user I/O 2006 may include a keyboard 2016, a pointing device, such as a mouse 2018, and a display 2020. Other user I/O 2006 components include voice or speech command systems, other pointing devices include touchpads and touchscreens, and other output devices besides a display, include a printer, a projector, a touchscreen, etc. Exemplary processing elements include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 2004, which may be a Random Access Memory (RAM), may store a plurality of program libraries or modules, such as an operating system 2022, and one or more application programs that interface to the operating system 2022, such as the simulation environment 100, including the concurrency engine 114. One or more objects or data structures may also be stored in the main memory 2004, such as the executable model 132, generated code, among other data structures.

The removable medium drive 2010 may accept and read one or more computer readable media 2024, such as a CD, DVD, floppy disk, solid state drive, tape, flash memory or other media. The removable medium drive 2010 may also write to the one or more computer readable media 2024.

Suitable computer systems include personal computers (PCs), workstations, servers, laptops, tablets, palm computers, smart phones, electronic readers, and other portable computing devices, etc. Nonetheless, those skilled in the art will understand that the computer system 2000 of FIG. 8 is intended for illustrative purposes only, and that the present disclosure may be used with other computer systems, data processing systems, or computational devices. The present disclosure may also be used in a networked, e.g., client-server, computer architecture, or a public and/or private cloud computing arrangement. For example, the simulation environment 100 may be hosted on a server, and accessed by a remote client through an application hosting system, such as the Remote Desktop Connection tool from Microsoft Corp.

Suitable operating systems 2022 include the Windows series of operating systems from Microsoft Corp. of Redmond, WA, the Android and Chrome OS operating systems from Google Inc. of Mountain View, CA, the Linux operating system, the MAC OS® series of operating systems from Apple Inc. of Cupertino, CA, and the UNIX® series of operating systems, among others. The operating system 2022 may provide services or functions for other modules, such as allocating memory, organizing data according to a file system, prioritizing requests, etc. The operating system 2022 may run on a virtual machine, which may be provided by the data processing system 2000.

As indicated above, a user or developer, such as an engineer, scientist, programmer, etc., may utilize one or more input devices, such as the keyboard 2016, the mouse 2018, and the display 2020 to operate the simulation environment 100, and construct one or more executable models, such as the executable model 132.

FIG. 9 is a schematic diagram of a distributed computing environment 2100 in which systems and/or methods described herein may be implemented. The environment 2100 may include client and server devices, such as two servers 2102 and 2104, and three clients 2106-2108, interconnected by one or more networks, such as network 2110. The devices of the environment 2100 may be interconnected via wired connections, wireless connections, or a combination of wired and wireless connections. The servers 2102 and 2104 may include one or more devices capable of receiving, generating, storing, processing, executing, and/or providing information. For example, the servers 2102 and 2104 may include a computing device, such as a server, a desktop computer, a laptop computer, a tablet computer, a handheld computer, or a similar device.

The clients 2106-2108 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 2106-2108 may download data and/or code from the servers 2102 and 2104 via the network 2110. In some implementations, the clients 2106-2108 may be desktop computers, workstations, laptop computers, tablet computers, handheld computers, mobile phones (e.g., smart phones, radiotelephones, etc.), electronic readers, or similar devices. In some implementations, the clients 2106-2108 may receive information from and/or transmit information to the servers 2102 and 2104.

The network 2110 may include one or more wired and/or wireless networks. For example, the network 2110 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The servers 2102 and 2104 may host applications or processes accessible by the clients 2106-2108. For example, the server 2102 may include a programming language/environment 2112, which may include or have access to the simulation environment 100. The server 2104 may include a code generator, such as the code generator 108, and a hardware synthesis tool 2114. The code generator 108 may generate code for an executable model, such as HDL code, which may be provided to the hardware synthesis tool 2114. The hardware synthesis tool 2114 may translate the generated code into a bitstream or other format, and may synthesize, e.g., configure, a target system 2116, which may be a real-world physical system. In this way, the functionality defined by the executable model may be deployed to a real-world physical system. For example, the hardware synthesis tool 2114 may configure a programmable logic device, such as a Field Programmable Gate Array (FPGA) or other Programmable Logic Device (PLD), of the target system 2116.

The number of devices and/or networks shown in FIG. 9 is provided as an example. In practice, there may be additional devices and/or networks, fewer devices and/or networks, different devices and/or networks, or differently arranged devices and/or networks than those shown in FIG. 9. Furthermore, two or more devices shown in FIG. 9 may be implemented within a single device, or a single device shown in FIG. 9 may be implemented as multiple, distributed devices. Additionally, one or more of the devices of the distributed computing environment 2100 may perform one or more functions described as being performed by another one or more devices of the environment 2100.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system (e.g., system 100) or a human user of a computer or data processing system, unless otherwise stated.

Further, certain embodiments described herein may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 2000. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, while the present disclosure describes allocating model portions to threads, model portions may additionally or alternatively be allocated to processes instead of threads. Therefore, it is the object of the appended claims to cover all such variations and modifications as come within the true spirit and scope of the disclosure.

What is claimed is:

1. A system, comprising:
a processor coupled to a memory, the processor configured to:
receive a plurality of first parameters for a first type-1 membership function (MF) that defines a first boundary of a footprint of uncertainty for an interval type-2 MF, wherein the interval type-2 MF is utilized by a fuzzy inference system that is executable in a computing environment, the fuzzy inference system included in an executable model where execution of the executable model executes the fuzzy inference system and generates results;
receive at least one second parameter, wherein the at least one second parameter is utilized to transform the first type-1 MF that defines the first boundary of the footprint of uncertainty for the interval type-2 MF;
generate, based on a transformation of the first type-1 MF utilizing the at least one second parameter, a second type-1 MF,
wherein the second type-1 MF defines a second boundary of the footprint of uncertainty for the interval type-2 MF, and
wherein the first type-1 MF and the second type-1 MF have a geometrical relationship relative to each other; and
adjust, after the transforming, the plurality of first parameters of the first type-1 MF and the at least one second parameter to adjust the footprint of uncertainty of the fuzzy inference system included in the executable model, wherein the adjusting is performed without needing to consider the geometrical relationship and the adjusting automatically maintains the geometrical relationship between the first and second boundaries, and wherein the footprint of uncertainty is defined by a total number of parameters that is equal to the plurality of first parameters and the at least one second parameter.

2. The system of claim 1, wherein the processor, when performing the transformation, is further configured to:
apply the at least one second parameter to at least one of: (1) one or more of the plurality of first parameters, or (2) membership values of the first type-1 MF, where the applying transforms the first type-1 MF to the second type-1 MF with a plurality of third parameters.

3. The system of claim 1, wherein the at least one second parameter is a lag parameter and a scale parameter, and wherein the processor, when performing the transformation, is further configured to:
determine at least one first input value that corresponds to at least one membership value of the first type-1 MF that equals the lag parameter;
transform the first type-1 MF to the second type-1 MF by scaling down a maximum membership value of the first type-1 MF by a factor equal to the scale parameter and by starting the second type-1 MF to increase from zero at the at least one first input value.

4. The system of claim 1, wherein the processor, when performing the transformation, is further configured to perform one or more of the following:
delay the first type-1 MF by a first value between 0 and 1, inclusive;
multiply a membership value of the first type-1 MF by a second value that is less than or equal to 1 to scale down the first type-1 MF;
subtract a first offset value from a plurality of membership values of the first type-1 MF to vertically shift the first type-1 MF; or
horizontally shift the first type-1 MF with a second offset value to produce a shifted type-1 MF and selecting minimum values of the first type-1 MF and the shifted type-1 MF.

5. The system of claim 1, wherein the at least one second parameter includes one or more of a scale parameter, a lag parameter, a shape scaling parameter, an offset parameter, or a hedge parameter.

6. The system of claim 1, wherein the interval type-2 MF is symmetric and the number of the at least one second parameter for transforming the first type-1 MF is 2.

7. The system of claim 1, wherein the interval type-2 MF is asymmetric and the number of the at least one second parameter for transforming the first type-1 MF is 3.

8. The system of 1, wherein the plurality of first parameters and the at least one second parameter are received via at least one of a command line interface and a graphical user interface.

9. A method comprising:
receiving a plurality of first parameters for a first type-1 membership function (MF) that defines a first boundary of a footprint of uncertainty for an interval type-2 MF, wherein the interval type-2 MF is utilized by a fuzzy inference system that is executable in a computing environment, the fuzzy inference system included in an executable model where execution of the executable model executes the fuzzy inference system and generates results;
receiving at least one second parameter, wherein the at least one second parameter is utilized to transform the first type-1 MF;
generating, by a processor and based on a transformation of the first type-1 MF utilizing the at least one second parameter, a second type-1 MF,
wherein the second type-1 MF defines a second boundary of the footprint of uncertainty for the interval type-2 MF, and
wherein the first type-1 MF and the second type-1 MF has a geometrical relationship relative to each other; and
adjusting, by the processor, the plurality of first parameters of the first type-1 MF and the at least one second parameter to adjust the footprint of uncertainty of the fuzzy inference system included in the executable model, where the adjusting is performed without needing to consider the geometrical relationship and the adjusting automatically maintains the geometrical relationship between the first and second boundaries, and wherein the footprint of uncertainty is defined by a total number of parameters that is equal to the plurality of first parameters and the at least one second parameter.

10. The method of claim 9, wherein the transforming further comprising:
applying the at least one second parameter to at least one of: (1) one or more of the plurality of first parameters, or (2) membership values of the first type-1 MF, where the applying transforms the first type-1 MF to the second type-1 MF with a plurality of third parameters.

11. The method of claim 9, wherein the at least one second parameter is a lag parameter and a scale parameter, and the method further comprising:
determining at least one first input value that corresponds to at least one membership value of the first type-1 MF that equals the lag parameter;

transforming the first type-1 MF to the second type-1 MF by scaling down a maximum membership value of the first type-1 MF by a factor equal to the scale parameter and by starting the second type-1 MF to increase from zero at the at least one first input value.

12. The method of claim 9, wherein the transforming further comprising one or more of the following:
delaying the first type-1 MF by a first value between 0 and 1, inclusive;
multiplying a membership value of the first type-1 MF by a second value that is less than or equal to 1 to scale down the first type-1 MF;
subtracting a first offset value from a plurality of membership values of the first type-1 MF to vertically shift the first type-1 MF; or
horizontally shifting the first type-1 MF with a second offset value to produce a shifted type-1 MF and selecting minimum values of the first type-1 MF and the shifted type-1 MF.

13. The method of claim 9, wherein the at least one second parameter includes one or more of a scale parameter, a lag parameter, a shape scaling parameter, an offset parameter, or a hedge parameter.

14. The method of claim 9, wherein the interval type-2 MF is symmetric and the number of the at least one second parameter for transforming the first type-1 MF is 2.

15. The method of claim 9, wherein the interval type-2 MF is asymmetric and the number of the at least one second parameter for transforming the first type-1 MF is 3.

16. The method of claim 9, wherein the plurality of first parameters and the at least one second parameter are received via at least one of a command line interface and a graphical user interface.

17. One or more non-transitory computer-readable media, having stored thereon instructions that when executed by a computing device, cause the computing device to perform operations comprising:
receiving a plurality of first parameters for a first type-1 membership function (MF) that defines a first boundary of a footprint of uncertainty for an interval type-2 MF, wherein the interval type-2 MF is utilized by a fuzzy inference system that is executable in a computing environment, the fuzzy inference system included in an executable model where execution of the executable model executes the fuzzy inference system and generates results;
receiving at least one second parameter, wherein the at least one second parameter is utilized to transform the first type-1 MF;
generating, based on a transformation of the first type-1 MF utilizing the at least one second parameter, a second type-1 MF,
wherein the second type-1 MF defines a second boundary of the footprint of uncertainty for the interval type-2 MF, and
wherein the first type1-MF and the second type-1 MF has a geometrical relationship relative to each other; and
adjusting, after the transforming, the plurality of first parameters of the first type-1 MF and the at least one second parameter to adjust the footprint of uncertainty for use in the executable model, wherein the adjusting is performed without needing to consider the geometrical relationship and the adjusting automatically maintains the geometrical relationship between the first and second boundaries, and wherein the footprint of uncertainty is defined by a total number of parameters that is equal to the plurality of first parameters and the at least one second parameter.

18. The one or more non-transitory computer-readable media of claim 17, wherein when transforming the instructions cause the computing device to perform operations further comprising:
applying the at least one second parameter to at least one of: (1) one or more of the plurality of first parameters, or (2) membership values of the first type-1 MF, where the applying transforms the first type-1 MF to the second type-1 MF with a plurality of third parameters.

19. The one or more non-transitory computer-readable media of claim 17, wherein the at least one second parameter is a lag parameter and a scale parameter, and wherein the instructions cause the computing device to perform operations further comprising:
determining at least one first input value that corresponds to at least one membership value of the first type-1 MF that equals the lag parameter;
transforming the first type-1 MF to the second type-1 MF by scaling down a maximum membership value of the first type-1 MF by a factor equal to the scale parameter and by starting the second type-1 MF to increase from zero at the at least one first input value.

20. The one or more non-transitory computer-readable media of claim 17, wherein when transforming the instructions cause the computing device to perform operations further comprising one or more of the following:
delaying the first type-1 MF by a first value between 0 and 1, inclusive;
multiplying a membership value of the first type-1 MF by a second value that is less than or equal to 1 to scale down the first type-1 MF;
subtracting a first offset value from a plurality of membership values of the first type-1 MF to vertically shift the first type-1 MF; or
horizontally shifting the first type-1 MF with a second offset value to produce a shifted type-1 MF and selecting minimum values of the first type-1 MF and the shifted type-1 MF.

21. The method of claim 9, wherein the at least one second parameter is one or more types of a plurality of different types of parameters and wherein the plurality of different types of parameters includes at least two of a scale type parameter, a lag type parameter, a shape scaling type parameter, an offset type parameter, or a hedge type parameter.

22. The one or more non-transitory computer-readable media of claim 17, wherein the at least one second parameter includes one or more of a scale parameter, a lag parameter, a shape scaling parameter, an offset parameter, or a hedge parameter.

23. The one or more non-transitory computer-readable media of claim 17, wherein the interval type-2 MF is symmetric and the number of the at least one second parameter for transforming the first type-1 MF is 2.

24. The one or more non-transitory computer-readable media of claim 17, wherein the interval type-2 MF is asymmetric and the number of the at least one second parameter for transforming the first type-1 MF is 3.

25. The one or more non-transitory computer-readable media of claim 17, wherein the plurality of first parameters and the at least one second parameter are received via at least one of a command line interface and a graphical user interface.

26. The one or more non-transitory computer-readable media of claim 17, wherein the at least one second parameter is one or more types of a plurality of different types of parameters and wherein the plurality of different types of parameters includes at least two of a scale type parameter, a lag type parameter, a shape scaling type parameter, an offset type parameter, or a hedge type parameter.

* * * * *